(12) United States Patent
Grigsby et al.

(10) Patent No.: US 7,526,512 B1
(45) Date of Patent: Apr. 28, 2009

(54) CONTENT-BASED SYNCHRONIZATION FOR TERMINAL DEVICES

(75) Inventors: Travis M. Grigsby, Austin, TX (US); Andrew Douglas Hately, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/105,977

(22) Filed: Apr. 18, 2008

(51) Int. Cl.
 *G06F 7/00* (2006.01)
(52) U.S. Cl. .......................... 707/200; 707/2; 370/350; 709/228; 709/231; 709/248
(58) Field of Classification Search ................. 707/2, 707/200; 709/228, 231, 248; 370/350
See application file for complete search history.

(56) References Cited

U.S. PATENT DOCUMENTS

| | | | |
|---|---|---|---|
| 6,272,545 | B1 | 8/2001 | Flanagin et al. |
| 6,671,702 | B2 | 12/2003 | Kruglikov et al. |
| 7,000,032 | B2 | 2/2006 | Kloba et al. |
| 2004/0117507 | A1 | 6/2004 | Torma |
| 2004/0142711 | A1 | 7/2004 | Mahonen et al. |
| 2006/0080415 | A1 | 4/2006 | Tu |
| 2006/0106937 | A1 | 5/2006 | Shields et al. |
| 2008/0043958 | A1 | 2/2008 | May et al. |
| 2008/0049714 | A1* | 2/2008 | Commarford et al. ....... 370/350 |

OTHER PUBLICATIONS

Daniel Salber et al., "The Design and Use of a Generic Context Server", GVU Center, College of Computing, Georgia Institute of Technology, Jan. 1998.

* cited by examiner

*Primary Examiner*—Hung Q Pham
(74) *Attorney, Agent, or Firm*—Wenderoth, Lind & Ponack, L.L.P.

(57) ABSTRACT

A method for context-based synchronization of selected items in at terminal device based on at least one context-based profile and acquired context. A context-based profile is created, wherein each context-based profile includes context-based items that are weighted according their level of importance, and items in the terminal device that are to be synchronized are selected in association with the context-based profile. When the terminal device receives an instruction to perform a synchronization operation related to the terminal device, the terminal device acquires context, and stores the context in the terminal device. The context is compared with the context-based profile stored in the terminal device, and it is determined whether the results of the comparison satisfy a threshold. Synchronization of the selected items in the terminal device is performed automatically or manually based on the determination of whether the comparison between the context and the at least one context-based profile satisfies the threshold.

1 Claim, 2 Drawing Sheets

CONTENT-BASED SYNCHRONIZATION FOR TERMINAL DEVICES

FIELD OF THE INVENTION

A method of synchronizing data and other applications in terminal devices based on current context.

BACKGROUND OF THE INVENTION

Personal communication devices are now part of every day life and are used regularly for the exchange of data both in personal and business applications. Thus, there is an ever increasing need for access to more and different types of data for use in personal communication devices. Additionally, the more useful the data is to the user's everyday life or a current context, the more useful and efficient personal communication device becomes.

With the increasing computing and storage capability of personal communication devices, there is more ubiquitous access to data from many different sources. However, this evaluation in technology also means that there is even more data that needs to be stored and managed by personal communication devices. Thus, the amount and type of data that can be efficiently managed and utilized by these devices is essential to their continued usefulness.

Most users of personal communication devices have several sets of data that need to be synchronized with their device. For example, one set of data for home, one set of data for the office and one set of data for the gym. Moreover, it would be very time consuming if a user is required to manually choose which set of data to synchronize at any give time.

Therefore, it would be useful to be able to synchronize different types of data in a personal communication device such that different types of data can be used seamlessly and is more relevant to a user's everyday life or current context.

SUMMARY OF THE INVENTION

According to an embodiment of the invention, a method includes synchronizing selected items in a terminal device based on at least one context-based profile and acquired context. A context-based profile is created, wherein each context-based profile includes context-based items that are weighted according their level of importance. For example, an importance level coefficient is assigned to each context-based element in the context-based profile.

Once the context-based profile is created, items to be synchronized in the terminal device are selected. The items selected are synchronized based on the context-based profile created. Different context-based profiles can be created for effecting synchronization of different items in the terminal device. Additionally, selected items in the terminal device can be synchronized with items of other terminal or network devices. The context-based profile is then stored in a memory location of the terminal device.

Next, the terminal device receives an instruction or control signal to perform a synchronization operation related to the terminal device, which can be received via a manual or automatic operation. Once the instruction is received, the terminal device acquires context. The acquired context is stored in the terminal device in a memory location, which may include the memory location used to store the context-based profile.

The context is compared with one or more the context-based profiles stored in the terminal device, and it is determined whether the result of the comparison between the context and the at least one context-based profile satisfies a threshold. The threshold is based on the importance level coefficients assigned to each context-based item in the context-based profile.

Synchronization of the selected items in the terminal device is performed automatically or manually based on the determination of whether the comparison between the context and the at least one context-based profile satisfies a threshold.

In an embodiment of the invention, the context-based profile is updated or modified after the manual selection of a context-based profile is selected for performing synchronization.

In an embodiment of the invention, the method of context-based synchronization noted above is performed on a terminal device that includes, but is not limited to, a cellular phone, smart phone, personal digital assistant (PDA) or other portable communication device having wireless capabilities.

Additional features are described herein, and will be apparent from the following Detailed Description Of The Invention.

BRIEF DESCRIPTION OF THE FIGURES

In the drawings, like reference numbers generally indicate identical, functionally similar and/or structurally similar elements. Embodiments of the invention will be described with reference to the accompanying drawings, wherein.

DETAILED DESCRIPTION OF THE INVENTION

Figure 1:
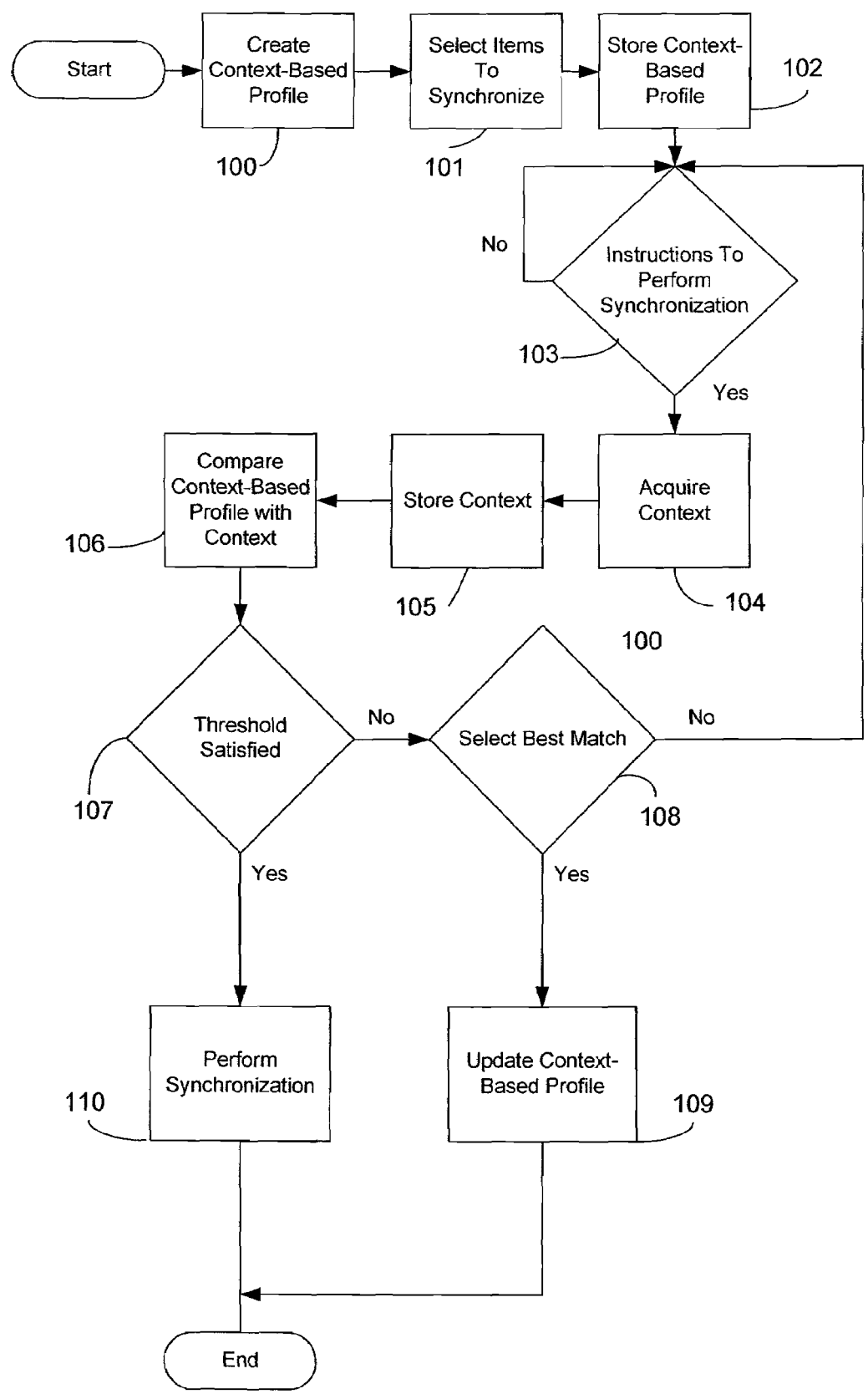
FIG. 1 is a flowchart illustrating an exemplary method of performing context-based synchronization in accordance with an embodiment of the present invention.

FIG. 1 illustrates an exemplary method of context-based synchronization for a terminal device in accordance with an embodiment of the invention. In this embodiment, at step 100, a user of a terminal device creates a context-based profile by sending instructions to the terminal device. The context-based profile is created for the synchronization of one or more items in the terminal device, or the synchronization of items in the terminal device with items in another device or network device. Exemplary items include, but are not limited to, application programs and data stored in the terminal device or stored in other terminal or network devices.

The user provides the instructions for creation of the context-based profile via a keypad, keyboard, touch screen or other similar input device. In step 101, the user determines a number of context-based items to be included in a particular context-based profile and assigns a level of importance to each context-based item. The importance levels assigned to the context-based items are based on the use of an importance level coefficient or modifier that may be selected from a range of 1 to 15, wherein 15 indicates the highest importance level and 1 indicates the lowest importance level. This range is provided as an example of the type of range contemplated by the present invention, but other ranges are possible. There can be any number of context-based items included in a profile, and different profiles can be created for the synchronization of different items in the terminal device, or for the synchronization of items in the terminal device and items in other terminal or network devices. An example of a context-based profile created is shown in Table 1 below.

TABLE 1

| CONTEXT-BASED ITEM | VALUE | IMPORTANCE LEVEL COEFF. |
|---|---|---|
| NETWORKS AVAILABLE | IBM | 10 |
| NETWORK(S) CONNECTED | IBM | 5 |
| DEVICES PRESENT | BLUETOOTH HEADSET | 5 |
| TIME OF DAY | 2:00 PM | 10 |
| POWER CONNECTION | ATTACHED | 10 |
| CALENDER STATUS | AVAILABLE | 10 |
| COST OF BANDWIDTH OF NETWORK USAGE | FREE | 10 |

In Table 1, the context-items listed relate to a current or given context that may be acquired by the terminal device. The context-based items in Table 1 include "networks available," "network(s) connected," "devices present," "time of day," "power connection," "calendar status"(i.e., in a meeting, on vacation, etc.), and "cost of bandwidth or network usage."Table 1 also lists the values and importance levels associated with each context-based item. For example, Table 1 indicates that the preference (i.e., value) for "networks available" is an IBM™ network and the preference for the "time of day" is 2:00pm. Additionally, the importance levels associated with these context-based items are indicated as highly important (i.e., 10) to the user of the terminal device.

Once the context-based profile is created, the user selects the items to be synchronized in the terminal device in step 101. The items selected may include, but are not limited to, application programs or data stored in the terminal device. The items selected will be synchronized in association with the context-based profile, and different context-based profiles can be created for effecting synchronization of different items. The context-based profile is then stored in a memory location of the terminal device in step 102.

At step 103, the terminal device determines if synchronization is being requested by receipt of a control signal. The control signal for requesting synchronization can be received via a manual input to the terminal device or from an internally generated signal from, for example, a processor or other control device. If no control signal is received, then the terminal device continues to monitor for the presence of a control signal. Otherwise, if synchronization is requested (i.e., a control signal is received), then in step 104 the terminal device acquires context.

The context is acquired by components and sensing devices in the terminal device that are capable of gathering information regarding current context. Referring to the context-based items in Table 1, the terminal device acquires context regarding "context available" or "network(s) connected" via a communication interface that allows the exchange of information across one or more wireless communication networks. Such networks may include cellular or short-range, such as IEEE 802.11 wireless local area networks (WLANS). And, the exchange of information may involve the transmission of radio frequency (FR) signals through an antenna. Additionally, the terminal device may acquire context regarding "devices present" by use of a context sensing device with Bluetooth, USB, infrared, or other similar capabilities. The sensing devices may also include components or systems having radio frequency identification (RFID) capabilities for receiving information regarding current context. The context may be acquired based on the location of the terminal device, the location of at least one other terminal device, operating conditions or characteristics of the terminal device, or at least one network that is connectable to the terminal device.

Once the context is acquired by the terminal device, the context is stored in a memory location of the terminal device in step 105. And, in step 106, the context is compared with one or more context-based profiles that were previously created and stored in the terminal device. The comparison between the context-based profile and the context is based on, for example, a context match index. The context match index is a weighted sum of how close each element of the context-based profile is to the context for a given context-based profile. In Table 1, the importance level coefficients (e.g., 5 and 10) are used for the creation of the context match index. For example, an importance level coefficient of 10 would represent 10 points to be added to the context match index, if the context for a particular context-based item in the profile is a match. Thus, not only is the current context taken into account, but it is possible determine context that is most important for a given context-based profile. Table 2 shows the results of a comparison between the context-based profile in Table 1 and the current context.

TABLE 2

| CONTEXT-BASED ITEM | VALUE | IMPORTANCE LEVEL | POINTS FOR CONTEXT ACQUIRED |
|---|---|---|---|
| NETWORKS AVAILABLE | IBM | 10 | 10 |
| NETWORK(S) CONNECTED | IBM | 5 | 5 |
| DEVICES PRESENT | BLUETOOTH HEADSET | 5 | 0 |
| TIME OF DAY | 2:00 PM | 10 | 0 |
| POWER CONNECTION | ATTACHED | 10 | 10 |
| CALENDER STATUS | AVAILABLE | 10 | 10 |
| COST OF BANDWIDTH OR NETWORK USAGE | FREE | 10 | 10 |
| MATCH INDEX | | | 45 |

In Table 2, the context match index is 45, which is based on the number of matches between the context-based items in the profile and the context acquired by the terminal device. In step 107, it is decided if the context match index satisfies a threshold value. The threshold value may be a user-chosen threshold. For example, the threshold for the profile in Table 1 may be set at 60, which would be the total sum of all the importance level coefficients for all the context-based items listed in the profile. By way of example, if the user-chosen threshold is 60, it would be determined (at step 107) that there is no match because the context match index 45 is below the user-chosen threshold of 60. Thus, in step 108, the user would be requested to select a "best match" or an alternative context-based profile for performing synchronization.

When a "best match" or alternative profile is selected, then in step 109 the context-based profile can be updated or adjusted. For example, the importance level coefficients for the context-based items can adjusted automatically (e.g., up or down) thereby altering the context match index that results (i.e., in step 106) if the same context is acquired in a future synchronization operation. In step 110, the synchronization is performed based on the "best match" or alternative profile selected. On the other hand, if no "best match" or alternative context-based profile is selected at step 108, then the terminal device continues to monitor for another control signal for performing synchronization. Therefore, when the match index is below the user-chosen threshold, the synchronization is considered to be more manually enacted because the selection of a "best match" or alternative profile is required before synchronization can be performed.

However, at step 107, if it is determined that the results of the comparison (in step 106) are above the user-chosen threshold, then synchronization at step 110 occurs automatically based on the match context-based profile. Thus, synchronization of the selected items in the terminal device is performed automatically or manually based on the results of the comparison between the context and the context-based profile. Synchronization is performed with regard to the items selected in association with the context-based profile. Exemplary items include, but are not limited to, application programs and data stored in the terminal device or stored in other terminal or network devices.

In alternative embodiments, the creation of a context-based profile includes the consideration of different context-based elements in other profiles stored in the terminal device. For example, if a user never seems to be concerned (i.e., low importance level coefficient) with bandwidth costs, then the context-based item "cost of bandwidth or network usage" in a new profile may be given a lower importance level coefficient automatically. Also, the context-based item for "time of day" may include a value that simply distinguishes between morning/afternoon/evening and weekends/weekday, or simply using closeness to time and day. Additionally, the context-based items may include a ranges or string of items such that if any one of the items in the range or string are matched with the context, then that context-based item as a whole is considered matched with the current context.

Figure 2:
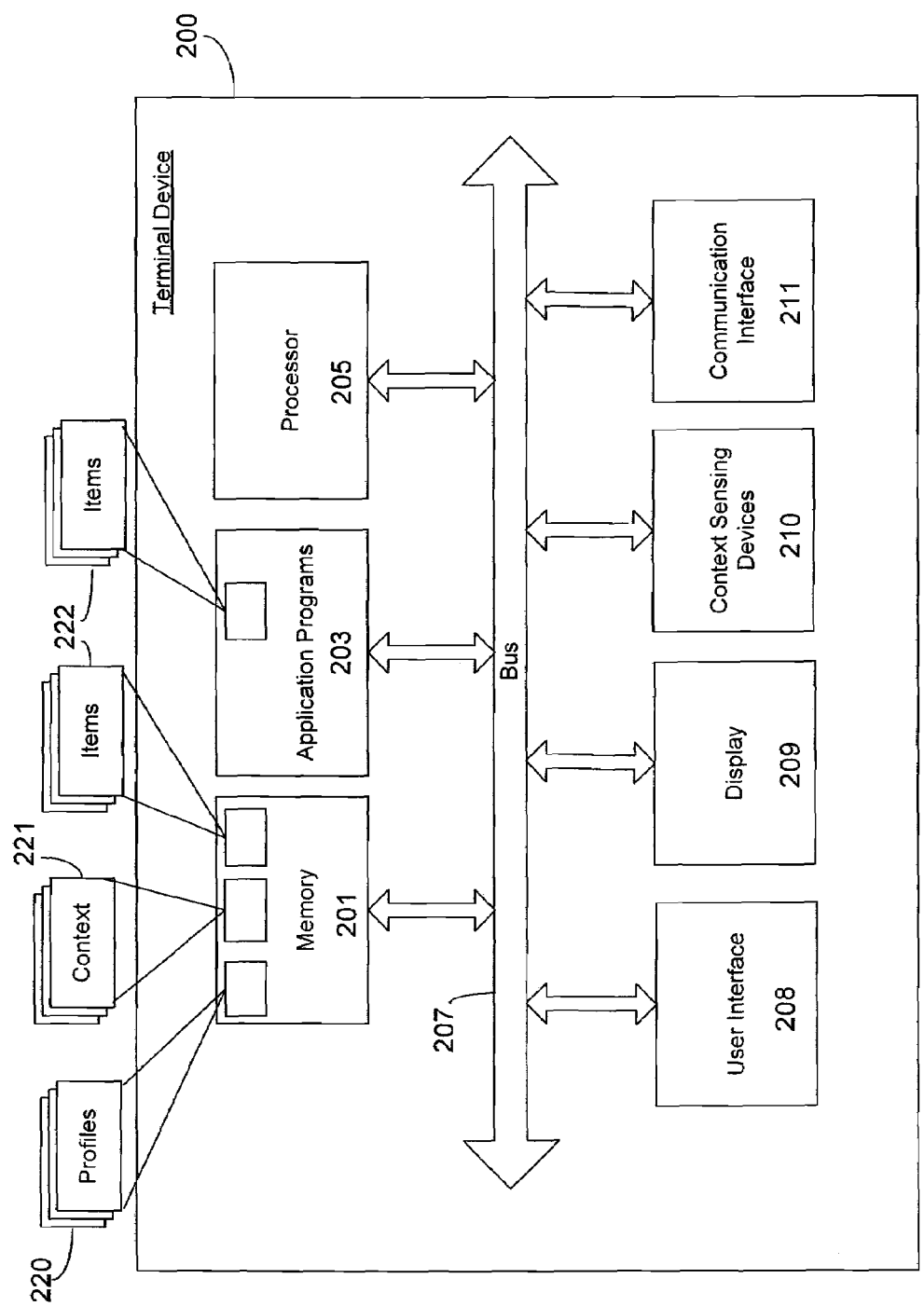
FIG. 2 is a block diagram of an exemplary terminal device used to perform the context-based synchronization method of FIG. 1.

FIG. 2 is a representative terminal device for performing the method of context-based synchronization of FIG. 1. In FIG. 2, the terminal device 200 includes a memory 201, application programs 203, processor 205, bus 207, user interface 208, display 209, context sensing devices 210 and communication interface 211. The terminal device 200 may include, but is not limited to, a cellular phone, smart phone, personal digital assistant (PDA) or other portable communications device having wireless capabilities. The memory 201 can be computer-readable media used to store executable instructions, or computer program thereon.

The memory 201 may include ROM, RAM, PROM, EPROM, smart card, SIMs, WIMs or any other medium from which a computing device can read executable instructions or a computer program. The term "computer program" is intended to encompass an executable program that exists permanently or temporarily on any computer-readable medium. As illustrated in FIG. 2, the memory 201 also stores the context-based profiles 220, acquired context 221 and items 222 selected for the context-based synchronization described in the discussion of FIG. 1. The items 222 may include either the data stored in the memory 201 or include one or more application programs 203.

The executable instructions or computer program stored in the memory 201 are executable by one or more processors 205, which may be facilitated by one or more of the application programs 203. The application programs 203 may also include, but are not limited to, an operating system or any special computer program that manages the relationship between application software and any suitable variety of hardware that helps to make-up a computer system or computing environment. The executable instructions or computer programs stored in the memory 201 also causes the terminal device to perform the context-based synchronization described in detail in the discussion of FIG. 1. General communication between the components in the terminal device 200 is provided via the bus 207.

The user interface 208 and display 209 allow interaction between a user and the terminal device 200. The user interface 208 may include a keypad, a keyboard, microphone, and/or speakers. The display 209 may include a visual display or monitor with touch screen capabilities. The context sensing devices 210 are used by the terminal device 200 to acquire current context 221. The sensing devices 210 may include RFID components or systems or receiving information regarding current context. Additionally, context sensing devices 210 may include component with Bluetooth, USB, infrared, or other similar capabilities.

The communication interface 211 provides for two-way data communications from the terminal device 200. By way of example, the communication interface 211 may be a digital subscriber line (DSL) card or modem, an integrated services digital network (ISDN) card, a cable modem, or a telephone modem to provide a data communication connection to a corresponding type of telephone line. As another example, communication interface 211 may be a local area network (LAN) card (e.g., for Ethernet™ or an Asynchronous Transfer Model (ATM) network) to provide a data communication connection to a compatible LAN.

Further, the communication interface 211 may include peripheral interface devices, such as a Universal Serial Bus (USB) interface, a PCMCIA (Personal Computer Memory Card International Association) interface, and the like. The communication interface 211 also allows the exchange of information across one or more wireless communication networks. Such networks may include cellular or short-range, such as IEEE 802.11 wireless local area networks (WLANS). And, the exchange of information may involve the transmission of radio frequency (FR) signals through an antenna (not shown).

From the description provided herein, those skilled in the art are readily able to combine software created as described with the an appropriate general purpose or special purpose computer hardware to create a mobile computer system and/or computer subcomponents embodying the invention and/or computer subcomponents for carrying out the features of the invention.

Additionally, it should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of synchronizing selected items in a terminal device based on at least one context-based profile stored in the terminal device and context acquired by the terminal device, the method comprising:

creating at least one context-based profile, the created at least one context-based profile including a plurality of context-based elements each being weighted according to an importance level coefficient;

selecting items in the terminal device to synchronize with items in another terminal device based on the created at least one context-based profile;

storing the created at least one context-based profile in the terminal device in association with the selected items;

receiving an instruction to perform a synchronization operation related to the terminal device;

acquiring context via the terminal device;

storing the acquired context in the terminal device;

comparing the stored context with the at least one context-based profile stored in the terminal device using the plurality of weighted context-based elements;
determining whether a result of the comparison between the stored context and the stored at least one context-based profile satisfies a threshold;
performing the synchronization of the selected items in the terminal device with items in another terminal device based on a the result of the determination;

if the result satisfies the threshold the synchronization of the selected items is performed automatically and if the result is not satisfied the threshold the synchronization of the selected items is performed manually, and wherein the terminal devices comprise cellular phones, smart phones, personal digital assistants.

* * * * *